US012024943B2

(12) United States Patent
Freirich et al.

(10) Patent No.: US 12,024,943 B2
(45) Date of Patent: Jul. 2, 2024

(54) STACKABLE COVERINGS WITH OVERPOWERED LIFT SYSTEMS AND RELATED SYSTEMS WITH HOLD-DOWN BRACKETS

(71) Applicant: Hunter Douglas Inc., Pearl River, NY (US)

(72) Inventors: Gordon Freirich, Tempe, AZ (US); Claude Mathew McNiel, Gilbert, AZ (US)

(73) Assignee: Hunter Douglas Inc., Pearl River, NY (US)

(*) Notice: Subject to any disclaimer, the term of this patent is extended or adjusted under 35 U.S.C. 154(b) by 210 days.

(21) Appl. No.: 17/531,890

(22) Filed: Nov. 22, 2021

(65) Prior Publication Data

US 2022/0162906 A1 May 26, 2022

Related U.S. Application Data

(60) Provisional application No. 63/117,695, filed on Nov. 24, 2020.

(51) Int. Cl.
*E06B 9/322* (2006.01)
*E06B 9/305* (2006.01)
*E06B 9/325* (2006.01)

(52) U.S. Cl.
CPC .............. *E06B 9/322* (2013.01); *E06B 9/305* (2013.01); *E06B 9/325* (2013.01)

(58) Field of Classification Search
CPC .......... E06B 9/322; E06B 9/305; E06B 9/325; E06B 9/30; E06B 9/302; E06B 9/303; E06B 9/32; E06B 9/26; E06B 9/262; E06B 2009/2622; E06B 2009/2625; E06B 2009/2627; E06B 2009/3222; A47H 1/142
See application file for complete search history.

(56) References Cited

U.S. PATENT DOCUMENTS 1,836,727 A * 12/1931 Rathe .................. E04F 10/0614 160/68
1,905,979 A * 4/1933 Burns ..................... E06B 9/325 160/172 R
2,027,570 A * 1/1936 Zingg ..................... E06B 9/325 160/349.1
2,061,939 A * 11/1936 Hammer ................. E06B 9/325 24/132 R
2,205,156 A * 6/1940 Rowley ................... E06B 9/325 292/345

(Continued)

*Primary Examiner* — Johnnie A. Shablack
(74) *Attorney, Agent, or Firm* — Dority & Manning, P.A.

(57) ABSTRACT

In one aspect, a covering for an architectural structure includes a headrail, a bottom rail supported relative to the headrail, and at least one stackable covering element positioned between the headrail and the bottom rail. The covering also includes an overpowered lift system configured to provide a lifting force that raises the bottom rail relative to the headrail towards a retracted position of the covering. In addition, the covering includes retention structure provided in operative association with the bottom rail, with the retention structure being configured to engage at least one hold-down bracket to hold the bottom rail in position relative to the headrail against the lifting force provided by the overpowered lift system.

20 Claims, 8 Drawing Sheets

(56) References Cited

U.S. PATENT DOCUMENTS

| | | | | | |
|---|---|---|---|---|---|
| 2,298,892 | A * | 10/1942 | Lorentzen | E06B 9/325 | 160/178.1 R |
| 2,402,769 | A * | 6/1946 | Nelson | E06B 9/325 | 248/262 |
| 2,428,170 | A * | 9/1947 | McDonald | E06B 9/325 | 160/281 |
| 2,614,784 | A * | 10/1952 | Nelson | E06B 9/325 | 248/262 |
| 2,637,382 | A * | 5/1953 | Nelson | E06B 9/388 | 160/178.1 R |
| 2,746,541 | A * | 5/1956 | Tash | E06B 9/325 | 160/349.1 |
| 2,781,837 | A * | 2/1957 | Peterson | E05F 11/00 | 160/328 |
| 2,822,868 | A * | 2/1958 | Roberts | E06B 9/325 | 160/173 R |
| 2,901,035 | A * | 8/1959 | Anderle | E06B 9/325 | 160/178.1 R |
| 2,925,861 | A * | 2/1960 | Long | E06B 9/325 | 248/500 |
| 3,447,586 | A * | 6/1969 | Anderle | E06B 9/325 | 248/500 |
| 4,475,580 | A * | 10/1984 | Hennequin | E06B 9/324 | 160/321 |
| 4,541,469 | A * | 9/1985 | Dressell | B60J 1/2088 | 160/178.1 R |
| 4,865,108 | A * | 9/1989 | Hennequin | E06B 9/327 | 160/279 |
| 5,052,460 | A * | 10/1991 | Buckingham | E06B 9/325 | 160/178.1 R |
| 5,067,545 | A * | 11/1991 | Wilkins | E06B 9/325 | 160/902 |
| 5,069,264 | A * | 12/1991 | Klawiter | E06B 9/325 | 160/178.1 R |
| 5,531,257 | A * | 7/1996 | Kuhar | E06B 9/60 | 160/170 |
| 6,186,214 | B1 * | 2/2001 | Ladd | E06B 9/325 | 292/DIG. 4 |
| 6,536,503 | B1 * | 3/2003 | Anderson | E06B 9/322 | 242/375.3 |
| 6,648,050 | B1 * | 11/2003 | Toti | E06B 9/322 | 242/375.3 |
| 6,968,884 | B2 | 11/2005 | Anderson et al. | | |
| 7,025,107 | B2 * | 4/2006 | Ciuca | E06B 9/322 | 160/170 |
| 7,114,545 | B2 * | 10/2006 | Null | E06B 9/266 | 160/173 R |
| 7,185,691 | B2 * | 3/2007 | Toti | F03G 1/08 | 74/354 |
| 7,841,376 | B2 * | 11/2010 | Lin | E06B 9/325 | 160/176.1 R |
| 7,886,803 | B2 * | 2/2011 | Anderson | E06B 9/80 | 160/170 |
| 8,820,388 | B2 * | 9/2014 | Mullet | E06B 9/322 | 160/310 |
| 9,091,115 | B2 * | 7/2015 | Mullet | E06B 9/322 | |
| 9,988,837 | B2 * | 6/2018 | Defenbaugh | E06B 9/322 | |
| 10,626,667 | B2 * | 4/2020 | Schulman | E06B 9/322 | |
| 10,954,716 | B2 * | 3/2021 | Anderson | E06B 9/326 | |
| 2015/0013920 | A1 * | 1/2015 | Mullet | E06B 9/303 | 160/84.02 |
| 2018/0291678 | A1 * | 10/2018 | Zheng | E06B 9/307 | |
| 2023/0220727 | A1 * | 7/2023 | McNiel | E06B 9/382 | 160/167 R |

* cited by examiner

STACKABLE COVERINGS WITH OVERPOWERED LIFT SYSTEMS AND RELATED SYSTEMS WITH HOLD-DOWN BRACKETS

CROSS-REFERENCE TO RELATED APPLICATIONS

The present application is based upon and claims the right of priority to U.S. Provisional Patent Application No. 63/117,695, filed Nov. 24, 2020, the disclosure of which is hereby incorporated by reference herein in its entirety for all purposes.

FIELD

The present subject matter relates generally to stackable coverings for architectural structures and, more particularly, to a stackable covering having an overpowered lift system and related systems with hold-down brackets for maintaining the covering in place despite the overpowered lift system.

BACKGROUND

Stackable coverings, such as Venetian blinds, are well known in the industry. A Venetian blind typically includes a headrail, a bottom rail, and a plurality of horizontally oriented slats supported between the headrail and the bottom rail. Additionally, a conventional Venetian blind will include two or more lift cords extending between the headrail and the bottom rail for adjusting the position of the bottom rail relative to the headrail, with each lift cord passing through a set of aligned route holes defined through the slats. While such placement of the lift cords within the route holes generally serves to make it more difficult to access the lift cords, manipulation of the lift cords is still possible. In this regard, various government regulations have been put in place and/or are proposed to address access to and manipulation of the lift cords. For instance, regulations are currently proposed that define limits or thresholds related to the user's ability to manipulate lift cords that are otherwise accessible to the user.

Accordingly, a stackable covering, such as a Venetian blind, and related system that incorporates features and/or components that facilitate limiting a user's ability to access and/or manipulate the lift cords of the covering would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a covering system for an architectural structure. The system includes a covering movable between an extended position and a retracted position. The covering includes a headrail, a bottom rail supported relative to the headrail, and at least one stackable covering element positioned between the headrail and the bottom rail. In addition, the covering includes an overpowered lift system configured to provide a lifting force that raises the bottom rail relative to the headrail towards the retracted position of the covering. In addition, the system includes at least one hold-down bracket configured to be mounted relative to the architectural structure.

Moreover, retention structure is provided in operative association with the bottom rail, with the retention structure being configured to engage the at least one hold-down bracket to hold the bottom rail in position relative to the headrail against the lifting force provided by the overpowered lift system.

In another aspect, the present subject matter is directed to a covering for an architectural structure, with the covering being movable between a retracted position and an extended position. The covering includes a headrail, a bottom rail supported relative to the headrail, and at least one stackable covering element positioned between the headrail and the bottom rail. The covering also includes an overpowered lift system configured to provide a lifting force that raises the bottom rail relative to the headrail towards the retracted position of the covering. In addition, the covering includes retention structure provided in operative association with the bottom rail, with the retention structure being configured to engage at least one hold-down bracket to hold the bottom rail in position relative to the headrail against the lifting force provided by the overpowered lift system.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
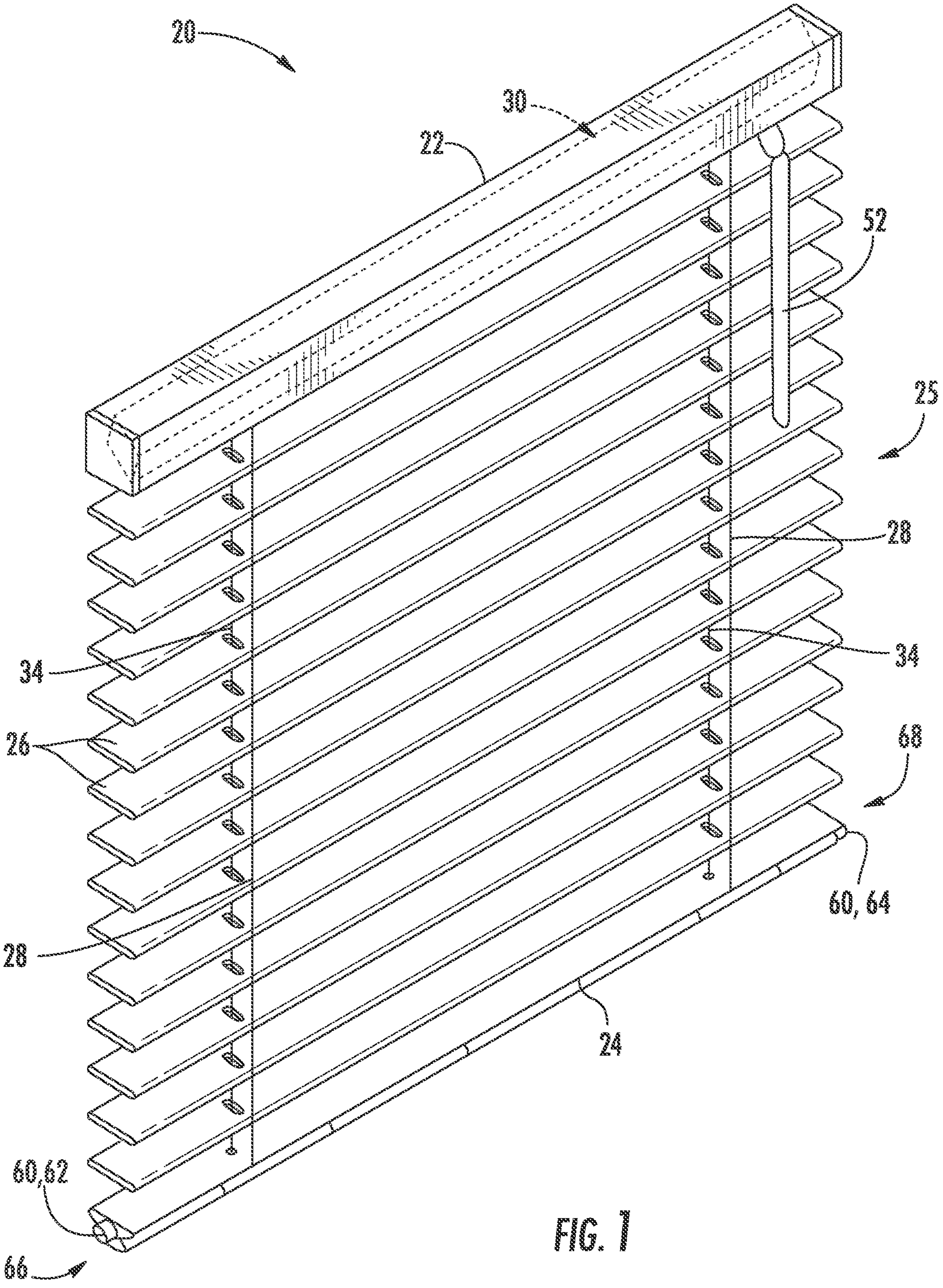
FIG. 1 illustrates a perspective view of one embodiment of a covering in accordance with aspects of the present subject matter.

In general, the present subject matter is directed to a stackable covering for an architectural feature or structure (referred to herein simply as an architectural "structure" for the sake of convenience and without intent to limit), as well as related covering systems for architectural structures. In several embodiments, the stackable covering includes a headrail, a bottom rail, and at least one stackable element supported or positioned between the headrail and the bottom rail. For instance, in one embodiment, the stackable element(s) comprises a plurality of slats supported between the headrail and the bottom rail.

Additionally, in several embodiments, the stackable covering includes an overpowered lift system for moving the covering from a lowered or fully extended position towards a raised or fully retracted position. As will be described below, the overpowered lift system may generally include one or more motors or motor assemblies configured to provide a torque output or lifting force that exceeds the torque demand or holding force otherwise required to maintain the covering at a given position (i.e., the torque/force required to hold the bottom rail at a given position relative to the headrail) along all or a portion of the drop length of the covering. Such excessive lifting force serves to maintain the covering's lift cords in tension and also limits the ability of a user to manipulate the lift cords, such as the ability to pull the lift cords outwardly away from the covering when at the fully extended position. For instance, due to the excessive lifting force, a significant amount of force may be required to pull the lift cords away from the covering.

In one embodiment, the overpowered lift system includes a variable torque spring motor assembly configured to provide a variable torque or lifting force that varies with the weight of the portion of the covering that is currently suspended from the headrail via the lift cords. Additionally, in one embodiment, the overpowered lift system further includes one or more secondary spring motors configured to provide a supplementary amount of torque/lifting force beyond that provided by the variable torque spring motor assembly. For instance, in one embodiment, the secondary spring motor(s) may be configured to provide a constant torque output to supplement the torque output of the variable torque spring motor assembly, which generally serves to shift the lift system's torque curve upwardly while still allowing a weight-compensated, variable lifting force to be applied through the lift cords.

Moreover, in accordance with aspects of the present subject matter, the covering may also be provided in operative association with suitable hold-down brackets configured to be mounted relative to an adjacent architectural structure to allow the bottom rail to be held in place against the overpowered lifting force of the lift system, thereby permitting the covering to be maintained in a non-retracted position(s) (e.g., the fully extended position and/or an intermediate position(s) defined between the fully extended and retracted positions). For instance, in several embodiments, retention structure may be provided in association with the bottom rail that is configured to engage with or otherwise couple to the hold-down brackets to maintain the bottom rail in position relative to the headrail at the installed location of the brackets. In such embodiments, with the bottom rail coupled to the hold-down brackets, the significant amount of tension within the lift cords provided via the overpowered lift system serves, again, to limit the ability of a user to manipulate or pull out the lift cords.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Figure 2:
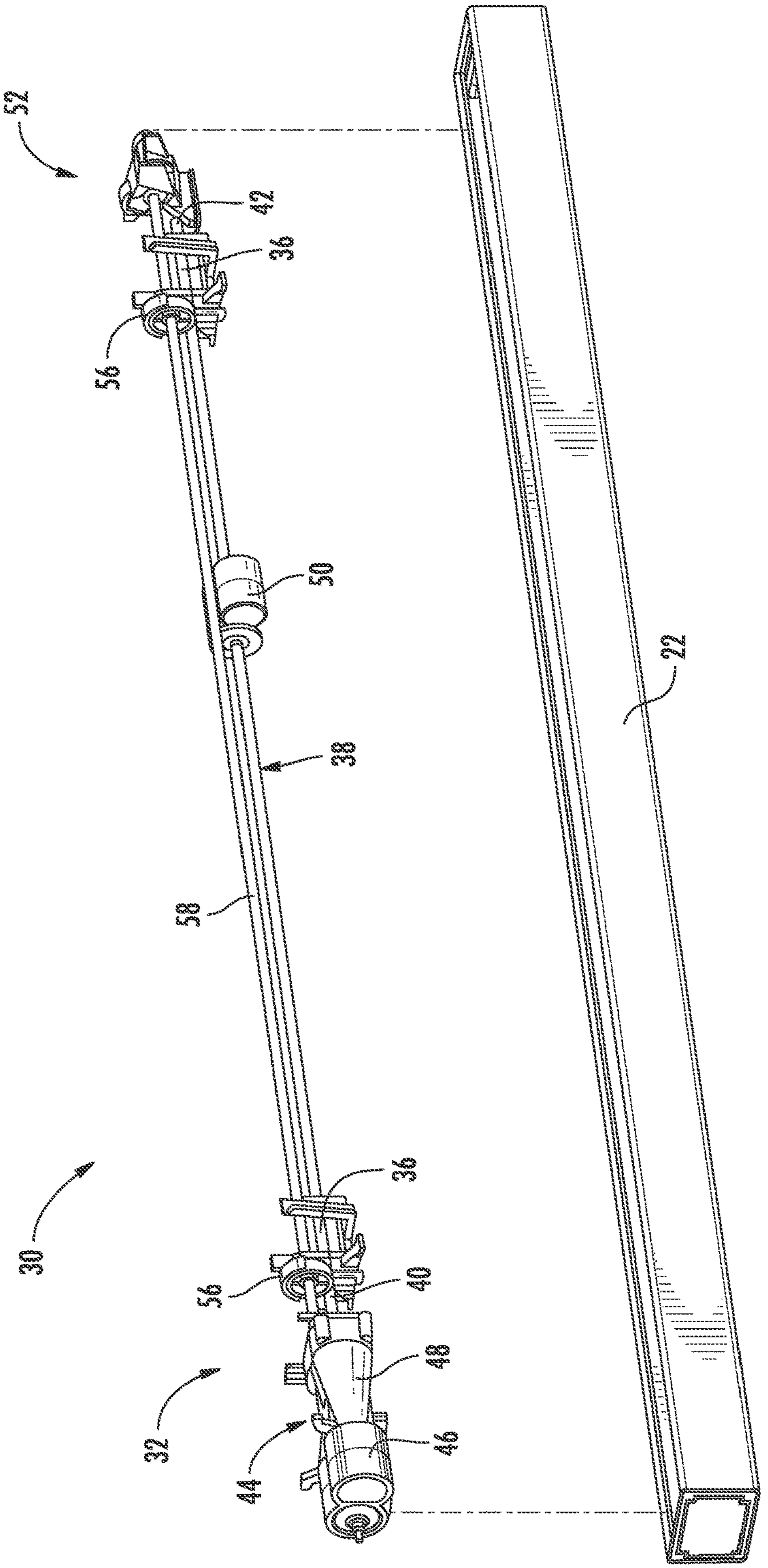
FIG. 2 illustrates a perspective view of one embodiment of the headrail and operating system of the covering shown in FIG. 1, particularly illustrating the components of the operating system exploded outwardly from the headrail for purposes of illustration.

Referring now to the drawings, FIGS. 1 and 2 illustrate perspective views of one embodiment of a stackable covering 20 for an architectural structure (not shown) in accordance with aspects of the present subject matter. Specifically, FIG. 1 illustrates a perspective view of the covering 20, while FIG. 2 illustrates a perspective, exploded view of the headrail and portions of the operating system of the covering 20 shown in FIG. 1, particularly illustrating components of the operating system exploded outwardly from the headrail for purposes of illustration. In general, the covering 20 is configured to be installed relative to a window, door, or any other suitable architectural structure as may be desired. In one embodiment, the covering 20 may be configured to be mounted relative to an architectural structure to allow the covering 20 to be suspended or supported relative to the architectural structure. It should be understood that the covering 20 is not limited in its particular use as a window or door shade, and may be used in any application as a covering, partition, shade, and/or the like, relative to and/or within any type of architectural structure.

As particularly shown in FIG. 1, the covering 20 includes a headrail 22, a bottom rail 24, and at least one stackable covering element(s) 25 positioned between the headrail 22 and the bottom rail 24. In several embodiments, the stackable covering 20 may be configured as a slatted blind, such as a Venetian-blind-type extendable/retractable covering, in which case the stackable covering element(s) 25 may comprise, for example, a plurality of horizontally disposed, parallel slats 26 configured to be supported between the headrail 22 and the bottom rail 24 via one or more ladder tape assemblies 28 (e.g., a pair of ladder tape assemblies 28). In such embodiments, the slats 26 may be rotatable or tiltable about their longitudinal axes by manipulating the ladder tape assemblies 28 to allow the slats 26 to be tilted between a horizontal or open position (e.g., as shown in FIG. 1) for permitting light to pass between the slats 26 and a closed position (not shown), wherein the slats 26 are substantially vertically oriented in an overlapping manner to occlude or block the passage of light through the covering 20. However, it should be appreciated that, in other embodiments, the stackable covering element(s) 25 may have any other suitable configuration and/or may comprise any other suitable covering element(s) depending on the type of stackable covering being utilized, such as by configuring the stackable covering element(s) 25 as a stackable fabric panel (e.g., a cellular or honeycomb panel) suitable for use with a stackable shade (e.g., cellular or honeycomb shade).

Additionally, an operating system 30 is also provided in operative association with the covering 20. As particularly shown in FIG. 2, in several embodiments, the operating system 30 includes an overpowered lift system 32 for moving the covering 20 from a lowered or fully extended position (e.g., as shown in FIG. 1) towards a raised or fully retracted position (not shown). In general, the term "overpowered" is used herein in relation to the lift system 32 to indicate that the lift system 32 is configured to provide a lifting force that exceeds a holding force required to maintain the bottom rail 24 at a given position relative to the headrail 22 (e.g., due to the weight of the suspended components, such as the slats 26 and the bottom rail 24) along all or a portion of the drop length of the covering 20. Thus, in the absence of an external mechanism or force that holds the covering 20 in place, the overpowered lift system 32 is configured to always lift the covering 20 from the fully extended position towards the fully retracted position. For instance, in one embodiment, the lift system 32 may be configured to provide a lifting force that exceeds the holding force required to maintain the bottom rail 24 at a given position along the entire drop length of the covering 20 such that the lift system 32 is always configured to fully raise the covering 20 from the fully extended position to the fully retracted position in the absence of an external holding mechanism/force. Alternatively, the lift system 32 may be configured to provide a lifting force that exceeds the holding force required to maintain the bottom rail 24 at a given position along only a portion of the drop length of the covering 20 (e.g., a lower portion of the drop length) such that the lift system 32 is always configured to raise the covering 20 from the fully extended position to an intermediate position disposed between the fully extended and fully retracted positions in the absence of an external holding mechanism/force.

In several embodiments, the lift system 32 includes one or more lift cords extending between the headrail 22 and the bottom rail 24. For instance, as shown in FIG. 1, the lift system 32 includes two lift cords 34 extending vertically between the headrail 22 and the bottom rail 24 at spaced apart locations along the lateral width of the covering 20, with each lift cord 34 passing through a respective set of aligned route holes defined in the slats 26. In one embodiment, each lift cord 34 may be configured to extend to a corresponding lift station 36 (FIG. 2) housed within the headrail 22 to control the vertical positioning of the bottom rail 24 relative to the headrail 22. In such an embodiment, a top end (not shown) of each lift cord 34 is configured to be coupled to its respective lift station 36 while an opposed, bottom end (not shown) of each lift cord 34 is configured to be coupled to the bottom rail 24. In one embodiment, each lift station 36 may include a lift spool(s) for winding and unwinding the respective lift cord 34. Thus, as the bottom rail 24 is raised relative to the headrail 22, each lift cord 34 is wound around its respective lift spool. Similarly, as the bottom rail 24 is lowered relative to the headrail 22, each lift cord 34 is unwound from its respective lift spool. In addition, as shown in FIG. 2, the lift system 32 may also include a lift rod 38 (e.g., including a first end 40 and an opposed second end 42) operatively coupled to the lift stations 36 and a spring motor assembly 44 operatively coupled to the lift rod 38 (e.g., at the first end 40 of the lift rod 38) for rotationally driving the rod 38. In such an embodiment, the spring motor assembly 44 may be configured to store energy as the bottom rail 24 is lowered relative to the headrail 22 and release such energy when the bottom rail 24 is being raised relative to the headrail 22 to lift the covering 20 to its retracted position.

In several embodiments, the spring motor assembly 44 may be configured as a weight compensating or variable torque spring motor assembly configured to provide a variable torque or lifting force that varies with the weight of the portion of the covering 20 that is currently suspended from the headrail 22 via the lift cords 34. Specifically, the suspended weight of the covering 20 is smallest when the covering 20 is at the fully extended position (e.g., due to the weight of the slats 26 being supported by the ladder tape assemblies 28) and generally increases as the bottom rail 24 is raised relative to the headrail 22 to move the covering 20 towards the fully retracted position (e.g., due to the weight of the slats 26 being transferred from the ladder tape assemblies 28 to the lift cords 34 as the slats 26 stack-up on the bottom rail 24). Thus, in several embodiments, the variable torque spring motor assembly 44 may be configured to provide a minimum torque or lifting force when the covering 20 is at the fully extended position and a maximum torque or lifting force when the covering 20 is at the fully retracted position, with the lifting force steadily increasing from the minimum lifting force as the covering 20 is raised from the extended position towards the retracted position. Such a variable torque or lifting force generally allows for the covering 00 to be raised in a controlled, smooth manner with a substantially constant lift speed.

As shown in FIG. 2, the variable torque motor assembly 44 includes a spring motor 46 (e.g., a B-spring motor) and a transmission 48 operably coupled between the spring motor 46 and the lift rod 38. In one embodiment, the spring motor 46 may be configured as a constant torque spring motor configured to apply a substantially constant torque output to the transmission 48 as the covering 20 is being raised from the extended position to the retracted position. In such an embodiment, the transmission 48 may be configured to convert the substantially constant torque provided by the spring motor 46 into a variable torque output to rotationally drive the lift rod 38. A suitable transmission for providing such a variable torque output is disclosed, for example, in U.S. Pat. No. 6,968,884 (the '884 patent), entitled "Modular Transport System for Coverings for Architectural Openings" and assigned to Hunter Douglas Inc., the disclosure of which is hereby incorporated by reference herein in its entirety for all purposes. As described in the '884 patent, a suitable transmission configuration may include a drive shaft (e.g., coupled to the output shaft of the spring motor), a tapered, threaded driven shaft coupled to the lift rod (e.g., via a gear(s)), and a transmission cord coupled to the drive shaft at one end and to the driven shaft at the other end. In such an embodiment, the transmission cord is configured to be wound onto the tapered driven shaft when the covering is in the fully extended position. To raise the covering, the spring motor rotationally drives the drive shaft, which winds the transmission cord onto the drive shaft and, thus, causes the tapered, threaded driven shaft to rotate, thereby rotationally driving the lift rod and causing the lift cords to wind around their respective lift spools of the lift stations. In contrast, when the covering is lowered, the lift cords are unwound from the lift spools, causing the lift rod to rotate in the opposite direction. Such opposite rotation of the lift rod results in the tapered driven shaft being rotated so as to wind up the transmission cord onto itself, which, in turn, rotates the drive shaft and, thus, causes the spring motor to wind back up to store potential energy. As should be apparent to those of ordinary skill in the art in view of the teachings of the '884 patent, the shafts of the transmission are tapered relative to each other so that the output force is greater when the covering is in the retracted position and is less when the covering is in the extended position.

It should be appreciated that, as used herein, a spring motor is considered to be a "constant torque motor" if the torque output of the spring motor varies by less than 10% as the covering 20 is being moved between the fully extended and fully retracted positions. In other words, a spring motor is considered as providing a "constant torque output" when its torque output varies by less than 10% along the entire drop length of the covering 20.

In one embodiment, to provide the overpowered lift system 32, the spring motor 46 of the variable torque motor assembly 44 may, itself, be overpowered. Specifically, in several embodiments, the spring of the spring motor 46 may be "sized-up" or otherwise selected to provide a greater output torque than would otherwise be required to lift the covering 20 (e.g., a torque associated with a resulting lifting force that exceeds the maximum lift force required to lift the covering 20). In such embodiments, the variable torque output applied to the lift rod 38 via the transmission 48 will always provide a lifting force that exceeds the force required to lift the covering 20 at each position along the drop length, thereby allowing the lift system 32 to automatically raise the covering 20 when the bottom rail 24 is otherwise unconstrained. Alternatively, the spring of the spring motor 46 may be selected to provide a greater output torque than would otherwise be required to lift the covering 20 from the fully extended position to an intermediate position defined between the fully extended and fully retracted positions In such an embodiment, the variable torque output applied to the lift rod 38 via the transmission 48 will provide a lifting force that exceeds the force required to lift the covering 20 at each position defined between the fully extended position and such intermediate position, thereby allowing the lift system 32 to automatically raise the covering 20 towards the intermediate position when the bottom rail 24 is otherwise unconstrained In addition to configuring the variable torque motor assembly 44 as an overpowered component of the lift system 32 (or as an alternative thereto), the lift system 32 may also include one or more booster motors (e.g., one or more B-spring motors) configured to provide additional torque or lifting force to the lift system 32. For example, as shown in FIG. 2, the lift system 32 includes a secondary spring motor 50 coupled to the lift rod 38 at a location spaced apart or separate from the variable torque motor assembly 44. As such, the spring motor 50 may be configured to directly transmit an additional or supplementary amount of torque to the lift rod 38 (e.g., independent of the transmission 48 and, in general, independent of the variable torque motor assembly 44) to assist in lifting the covering 20 towards the fully retracted position. In one embodiment, the secondary spring motor 50 may be configured as a constant torque motor. As such, the secondary spring motor 50 may function to apply a constant torque output to the lift rod that serves as an additional or supplementary torque output to the torque output provided by the variable torque motor assembly 44.

It should be appreciated, although the FIG. 2 illustrates the lift system 32 as including a single secondary spring motor 50, the lift system 32 may be configured to include any number of secondary spring motors 50, such as two or more secondary spring motors. For instance, multiple secondary spring motors 50 may be installed side-by-side along the length of the lift rod 38 (e.g., along the rod length defined between the transmission 48 and the opposed end 42 of the rod 38) to provide the desired amount of additional or supplementary torque output to the lift system 32.

It should also be appreciated that, by using the booster or secondary spring motor(s) 50, the variable torque motor assembly 44 need not necessarily be configured as an overpowered component of the lift system 32. For instance, in one embodiment, the variable torque motor assembly 44 may be underpowered or may be balanced relative to the torque demand of the covering 20 (e.g., such that the torque or lifting force provided by the motor assembly 44 falls within a torque band defined relative to a base torque demand required to maintain the covering 20 at a given position), in which case the additional or supplementary torque output provided by the secondary spring motor(s) 50 may be used to sufficiently increase the total lifting force to provide an overpowered lift system 32. Alternatively, as indicated above, the variable torque motor assembly 44 may, itself, be configured as an overpowered component of the lift system 32, in which case the additional or supplementary torque output provided by the secondary spring motor(s) 50 is used to further increase the overpowered state of the lift system 32.

As alternative to the variable torque motor assembly 44 (and optional booster motors 50), the lift system 32 may, instead, simply include one or more constant torque spring motors without inclusion of a corresponding transmission. In such an embodiment, the spring motor(s) may be selected so as to provide a torque output to the lift rod 36 that generates a lifting force that exceeds the force required to lift the covering 20 along all or a portion of the covering's drop length, thereby providing an overpowered lift system 32 for the covering 20.

As will be described in greater detail below with reference to FIG. 4, the disclosed covering 20 may also be provided in operative association with suitable hold-down brackets configured to be mounted relative to an adjacent architectural structure to allow the bottom rail 24 to be held in place against the overpowered lifting force of the lift system 32, thereby permitting the covering 20 to be maintained in a non-retracted position(s) (e.g., the fully extended position and/or an intermediate position(s) defined between the fully extended and retracted positions) associated with the installed location(s) of the hold-down brackets. In such embodiments, the covering 20 may include suitable retention structure 60 for engaging the hold-down brackets. For instance, as shown in FIG. 1, the bottom rail 24 includes retention structure 60 in the form of retention pins extending or projecting outwardly from opposed lateral sides of the rail 24. Specifically, in the illustrated embodiment, a first retention pin 62 extends or projects outwardly from a first lateral side 66 of the bottom rail 24 while a second retention pin 64 extends or projects outwardly from an opposed second lateral side 68 of the bottom rail 24. In such an embodiment, each retention pin 62, 64 may be configured to engage a respective bracket of a pair of opposed hold-down brackets installed relative to an adjacent architectural structure when the bottom rail 24 is positioned between such hold-down brackets. For instance, as will be described below, the retention pins 62, 64 may be configured to engage corresponding retention hooks or arms of the hold-down brackets to hold the bottom rail 24 in place relative to the brackets.

Additionally, it should be appreciated that, when the covering 20 is configured as a slatted or Venetian blind, the operating system 30 may also include a tilt system 52 to allow the slats 26 to be tilted between their open and closed positions. As shown in the illustrated embodiment, the tilt system 52 includes an operator control device (e.g., a tilt wand 54 (FIG. 1)) and one or more tilt-related components housed within or otherwise supported by the headrail 22, such as a tilt station 56 (FIG. 2) provided in operative association with each ladder tape assembly 28 and a tilt rod 58 (FIG. 2) coupled between the tilt wand 54 and the tilt stations 56. In such an embodiment, as the tilt wand 54 is manipulated by the user (e.g., by rotating the tilt wand 54 relative to the headrail 22), the tilt rod 58 may be rotated to rotationally drive one or more tilt drums (not shown) of the tilt stations 56, thereby allowing front and rear ladder rails (not shown) of each ladder tape assembly 28 to be raised or lowered relative to each other to adjust the tilt angle of the slats 26.

It should also be appreciated that the configuration of the covering 20 described above and shown in FIGS. 1 and 2 is provided only to place the present subject matter in an exemplary field of use. Thus, it should be apparent that the present subject matter may be readily adaptable to any suitable manner of covering configuration. For example, as an alternative to a slatted or Venetian blind, the covering 20 may be configured as any other suitable stackable covering, such as a honeycomb covering, a cellar shade and/or any other non-roller-based covering including a stackable covering element(s) supported between opposed rails.

Figure 3:
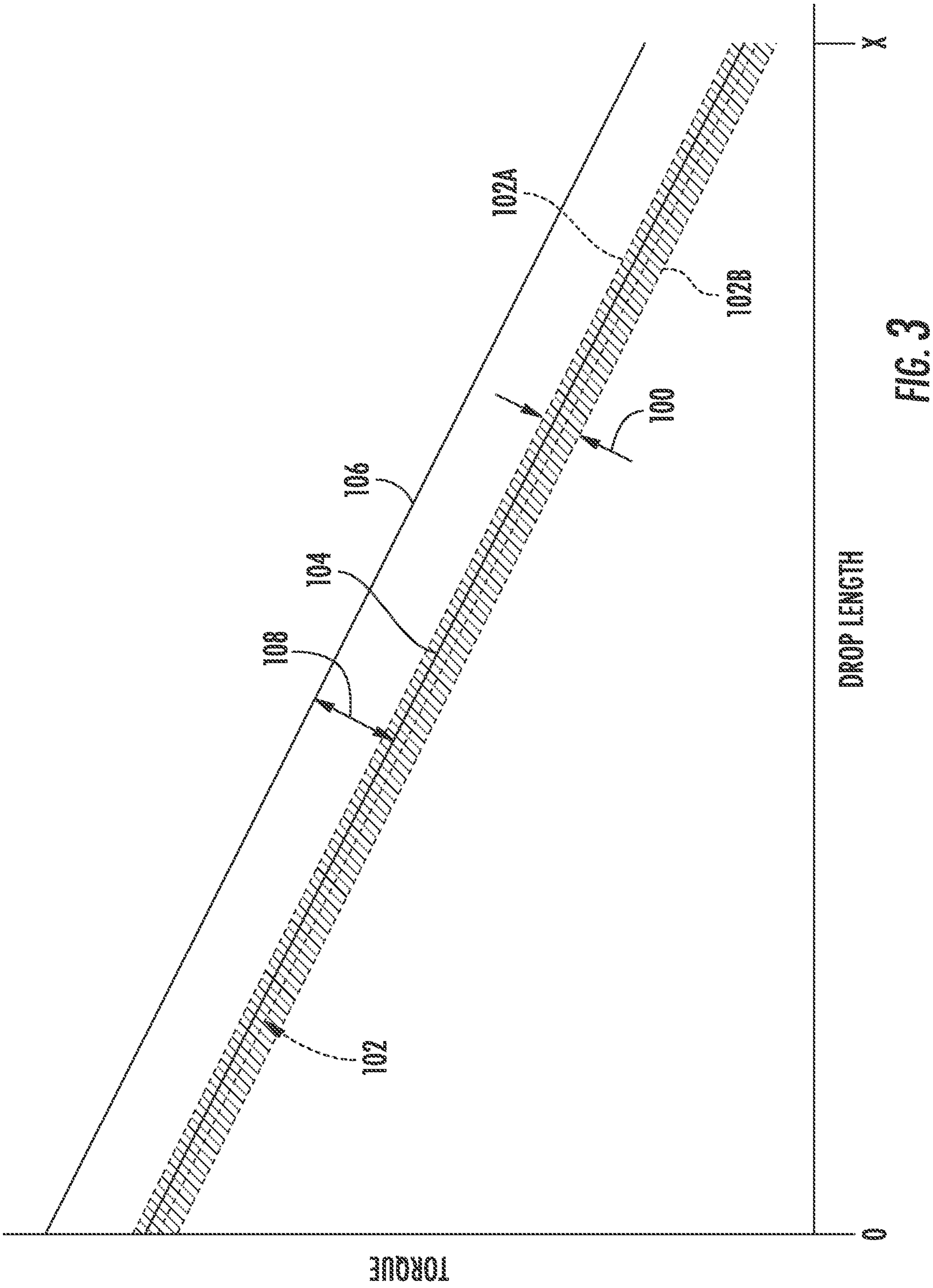
FIG. 3 illustrates example torque curves for a covering in accordance with aspects of the present subject matter.

Referring now to FIG. 3, example torque curves for a covering are illustrated in accordance with aspects of the present subject matter. In general, each torque curve is plotted as a function of the torque (i.e., along the y-axis) at each location along the drop length of the covering (i.e., along the x-axis), with a zero drop length corresponding to the fully retracted position for the covering and a drop length of X correspond to the fully extended position for the covering. As shown in FIG. 3, an exemplary torque range or band 100 is plotted that incorporates a base torque curve 102 representing the torque demand for a given covering as a function of the drop length (e.g., the torque required to maintain or hold the covering in position as the suspended weight of the covering varies along the drop length), with the torque band 100 including upper and lower margins or thresholds 102A, 102B defined relative to the base torque curve 102 to account for hysteresis within the system. In addition, FIG. 3 illustrates a first torque curve 104 representing the torque output (as a function of drop length) for a lift system including a variable torque motor assembly and a second torque curve 106 representing the torque output (as a function of drop length) for a lift system including the combination of a variable torque motor assembly and one or more constant torque booster motors.

As shown in FIG. 3, the first torque curve 104 generally illustrates the weight-compensated torque or lifting force provided via the variable torque motor assembly. Specifically, the variable torque motor assembly provides a minimum torque when the covering is at the fully extended position and a maximum torque when the covering is at the fully retracted position, with the applied torque increasing with movement of the covering from the extended position to the retracted position to account for the variable weight of the covering along its drop length. As a result of such weight-compensated or variable torque, the torque curve 104 achieved via the variable torque motor assembly can be made to generally track or extend parallel to the base torque curve 102 for the covering, thereby allowing for smooth, controlled lifting of the covering at a generally constant lift speed.

Additionally, the second torque curve 106 generally illustrates the impact provided by the addition of a constant torque booster motor to the lift system in the manner described above with reference to FIG. 2. As shown, the incorporation of the booster motor results in the torque curve 106 being shifted upwardly relative to the first torque curve 104 by an amount 108 generally equal to the additional or supplementary lifting force provided by the booster motor. In this regard, by simply shifting the torque curve upwardly as opposed to varying the slope of the curve, the advantages of a weight-compensated, variable torque system (e.g., smooth, controlled lifting at a generally constant lift speed) can still be achieved, while ensuring that the lift system is sufficiently overpowered to provide desired operation of the covering in accordance with aspects of the present subject matter.

It should be appreciated that, in the illustrated embodiment, the first torque curve 104 falls within the acceptable torque band 100 defined relative the base torque curve 102 for the covering and, thus, is generally representative of a torque curve associated with a variable torque motor assembly forming part of a balanced lift system. In such embodiments, the booster motor(s) may be added to the lift system to shift the lift system's torque curve upwards above the upper threshold 102A of the torque band 100 (e.g., as shown in FIG. 3 by the increase from the first torque curve 104 to the second torque curve 106). However, as indicated above, as opposed to being balanced relative to the torque demand for the covering, the variable torque motor assembly may, itself, be overpowered (e.g., such that the first torque curve 104 is positioned above the upper threshold 102A of the torque band 100), in which case the booster motor(s) may simply correspond to an optional component for providing an additional or supplementary torque for the lift system. Alternatively, the variable torque motor assembly may be underpowered (e.g., such that the first torque curve 104 is positioned below the lower threshold 102B of the torque band 100), in which case the additional or supplementary torque provided by the booster motor(s) may be used to shift the lift system's torque curve from a location below the lower threshold 10B to a location above the upper threshold 102A of the torque band 100.

It should also be appreciated that the second torque curve 106 is generally representative of a torque curve that would be associated with an overpowered lift system configured to automatically raise the covering along the entirety of its drop length from the fully extended position to the fully retracted position. However, as indicated above, alternative embodiments of the disclosed lift system may be configured to provide a torque output that exceeds the upper threshold 102A of the torque band 100 along only a portion of the covering's drop length (e.g., the lower portion of the drop length). In such embodiments, the lift system may only be configured to automatically raise the covering along a portion of the drop length from the fully extended position to an intermediate position defined between the fully extended and fully retracted positions. Referring now to FIG. 4, a partially exploded, perspective view of one embodiment of a covering system 200 for an architectural structure is illustrated in accordance with aspects of the present subject matter. For purposes of description, the disclosed system 200 will generally be described with reference to the covering 20 described above with reference to FIGS. 1 and 2. However, it should be appreciated that, in other embodiments, the system 200 may be advantageously utilized with coverings having any other suitable configuration.

Figure 4:
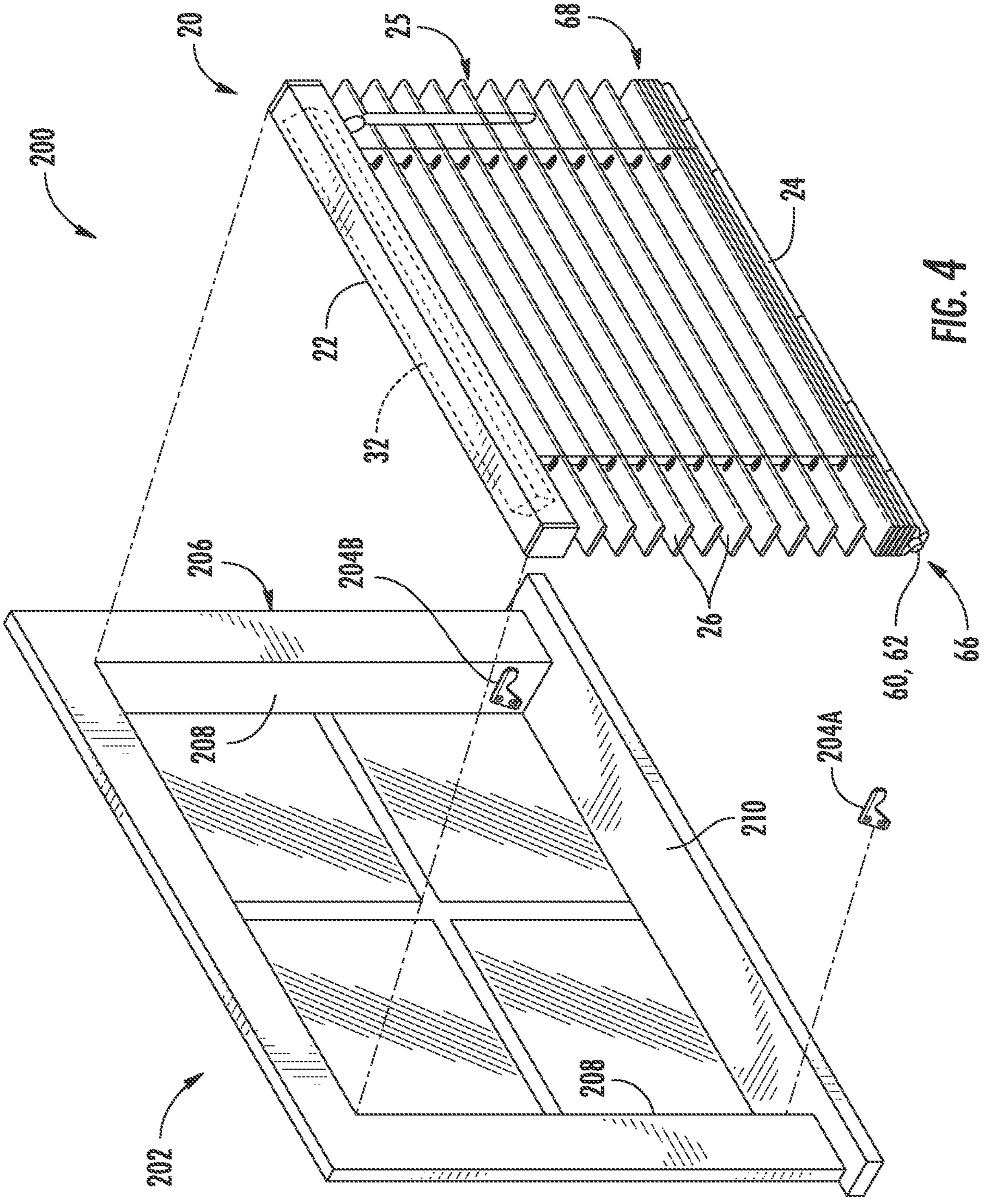
FIG. 4 illustrates a partially exploded, perspective view of one embodiment of a covering system in accordance with aspects of the present subject matter.

As shown in FIG. 4, the system 200 includes a covering 20 configured to be installed relative to a window, door, or any other suitable architectural structure 202, such as by mounting the covering 20 relative to the architectural structure 202 such that the covering 20 is suspended or supported relative to the architectural structure 202. As indicated above, in one embodiment, the covering 20 may include a headrail 22, a bottom rail 24, and at least one stackable covering element 25 supported between the headrail 22 and the bottom rail 24. For instance, in one embodiment, the stackable covering element(s) 25 may comprise a plurality of slats 26 supported between the rails 22, 24 (e.g., via ladder tape assemblies). However, in other embodiments, the covering 20 may be configured as any other suitable stackable covering, such as a honeycomb shade or a cellular shade. Additionally, regardless of the type of stackable covering utilized within the system 200, the covering 20 includes an operating system 30 having an overpowered lift system 32 configured to automatically raise the covering 20 from the fully extended position towards the fully retracted position. For instance, as described above, the overpowered lift system 32 may, in one embodiment, include a variable torque motor assembly with or without one or more booster or secondary spring motors.

Additionally, in several embodiments, the system 200 also includes one or more pairs of hold-down brackets 204 provided in operative association with the architectural structure 202 to allow the covering 20 to be held in place relative to the architectural structure 202 at a desired position(s). For instance, in the illustrated embodiment, the system 200 includes a pair of hold-down brackets (e.g., a first hold-down bracket 204A and a second hold-down bracket 204B) configured to be installed or mounted relative to the architectural structure 202 such that the covering 20 can be held at the fully extended position. Specifically, as shown in FIG. 4, the hold-down brackets 204 are configured to be installed at the bottom of an associated frame 206 of the architectural structure 202 (e.g., one on each stile 208 at a location adjacent to a bottom wall 210 of the frame 206, such as the window sill of a window frame) to allow the covering 20 to be held in place at the bottom of such frame 206. However, in other embodiments, the hold-down brackets 204 may be installed at any other suitable location relative to the architectural structure 202 to allow the covering 20 to be held in place at such position.

Additionally, it should be appreciated that, although a single pair of hold-down brackets 204 is shown in the illustrated embodiment, two or more pairs of hold-down brackets 204 may be installed at differing locations relative to the architectural structure 202, thereby allowing the covering 20 to be held in place at each of such locations. For instance, in one embodiment, one pair of hold-down brackets 204 may be installed relative to the architectural structure 202 as shown in FIG. 4 to allow the covering 20 to be maintained at its fully extended position, while one or more other pairs of hold down brackets may be installed at one or more other locations along the side stiles 208 of the frame 206 to allow the covering 20 to be maintained at one or more corresponding intermediate positions defined between the fully extended and fully retracted positions for the covering 20.

It should be appreciated that, in the illustrated embodiment, the hold-down brackets 204 are configured to be installed within the frame 206 of the architectural structure 202 to accommodate an inside-mounting arrangement for the covering 20. However, in other embodiments, the hold-down brackets 204 may be configured to be installed outside the frame 206 (e.g., on an adjacent wall) to accommodate an outside-mounting arrangement for the covering 20. Exemplary embodiments of hold-down brackets configured for inside-mount arrangements and outside-mount arrangements will generally be described below with reference to FIGS. 5-10 and FIGS. 11-17, respectively.

Moreover, as indicated above, the covering 20 may include or be associated with suitable retention structure 60 for engaging the hold-down brackets 204. For instance, as shown in the illustrated embodiment, the covering 20 includes retention structure 60 in the form of retention pin 62, 64 extending outwardly from each lateral side 66, 68 of the bottom rail 24. In such an embodiment, each retention pin 62, 64 may be configured to engage with or otherwise couple to an adjacent bracket of the pair of hold-down brackets 204. For example, with the covering 20 and hold-down brackets 204 installed relative to the architectural structure 202, the bottom rail 24 may be configured to be positioned directly between the hold-down brackets 204 when the covering 20 is at the extended position, with the first lateral side 66 of the rail 24 being positioned adjacent to the first hold-down bracket 204A and the second lateral side 68 of the rail 24 being positioned adjacent to the second hold-down bracket 204B. In such an embodiment, the first and second retention pins 62, 64 may generally be configured to be coupled to the first and second hold-down brackets 204A, 204B, respectively, to allow the bottom rail 24 to be held in place against the lifting force provided by the overpowered lift system 32, thereby permitting the covering 20 to be maintained at the retracted position relative to the architectural structure. It should be appreciated that, as an alternative to the retention pins 62, 64, the covering 20 may, in alternative embodiments, include any other suitable retention structure configured to engage with or otherwise couple to the hold-down brackets 204.

As described above, the excessive lifting force provided by the overpowered lift system 32 of the covering 20 serves to limit the ability of a user to manipulate or pull out the lift cords 34 (FIG. 1). Specifically, when the bottom rail 24 is coupled to the hold-down brackets 204 via the retention structure, the significant amount of tension within the lift cords 34 provided via the lift system 32 prevents the cords 34 from being pulled away from the slats 26 without the application of a significant amount of force thereto. For instance, the overpowered lift system 32 may be designed such that the lift cords 34 cannot be pulled away from the slats 26 unless an outward force is applied to the cords 34 that exceeds a given threshold force. Moreover, in addition to the over-tensioned lift cords 34 provided when the bottom rail 24 is coupled to the hold-down brackets 204, the length of the cords 34, themselves, may also be selected to prevent the lift cords 34 from being pulled outwardly from the slats 26 beyond a certain degree. For instance, with the hold-down brackets 204 positioned relative to the architectural structure 202 so as to hold the bottom rail 24 in place at the fully extended position for the covering 20, the length of the lift cords 34 may be selected such that each cord 34 is fully unwound from its respective lift spool (less any additional minimal cord length required, for example, to move the bottom rail 24 slightly downwardly relative to the hold-down brackets 204 to disengage the rail 24 therefrom), thereby preventing the lift cords 34 from being pulled outwardly from the slats 26 beyond a minimal amount when the bottom rail 24 is coupled to the brackets 204.

Figure 5:
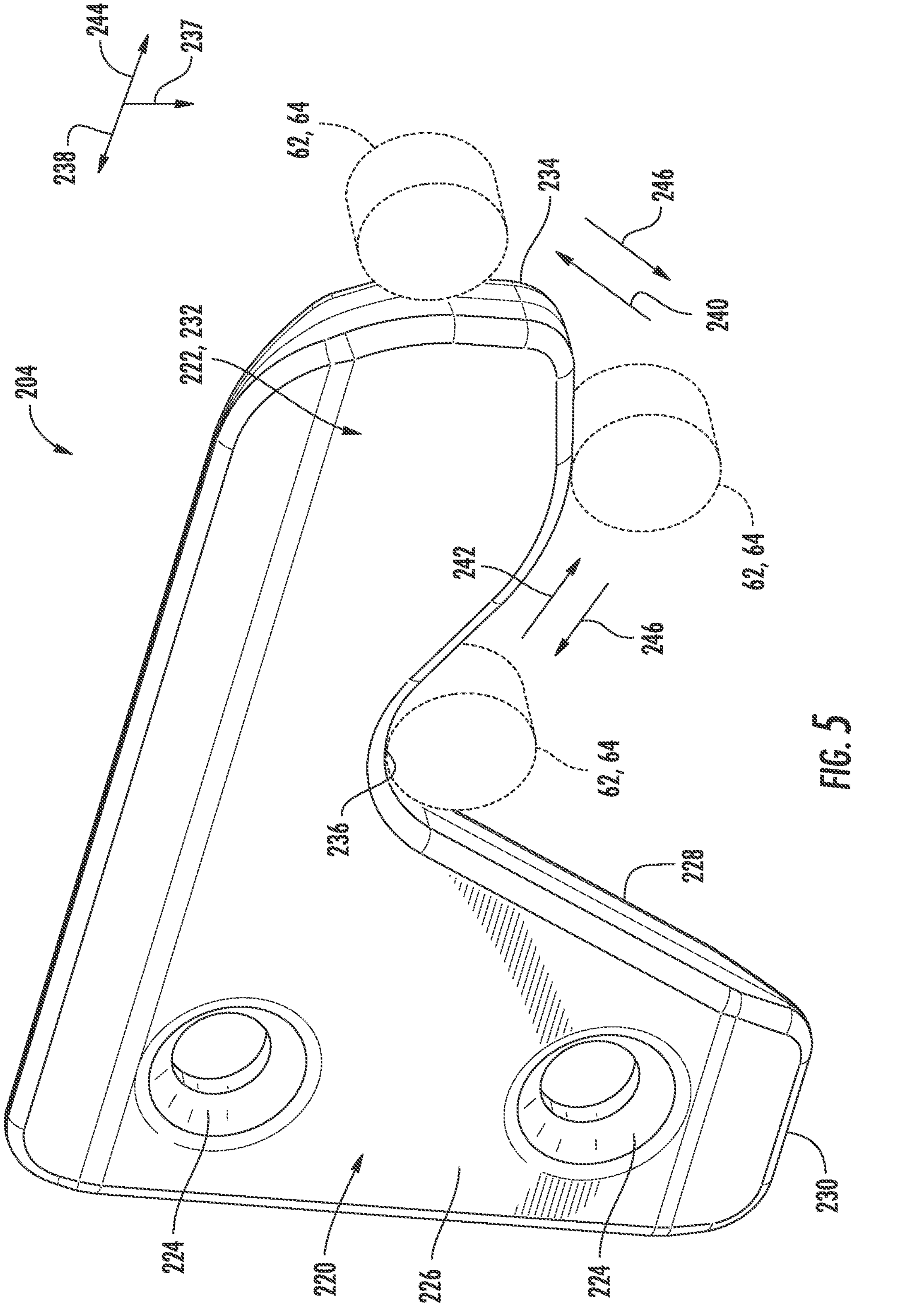
FIG. 5 illustrates a perspective view of one embodiment of a hold-down bracket suitable for use within the disclosed covering system in accordance with aspects of the present subject matter.
Figure 9:
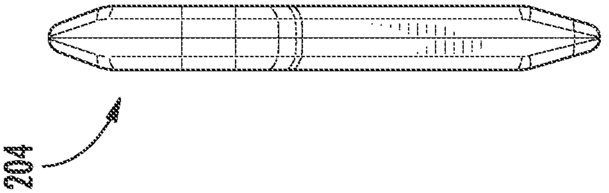
FIG. 9 illustrates a right side view of the hold-down bracket shown in FIG. 5.
Figure 6:
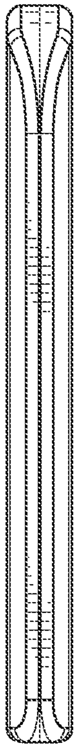
FIG. 6 illustrates a top view of the hold-down bracket shown in FIG. 4.
Figure 10:
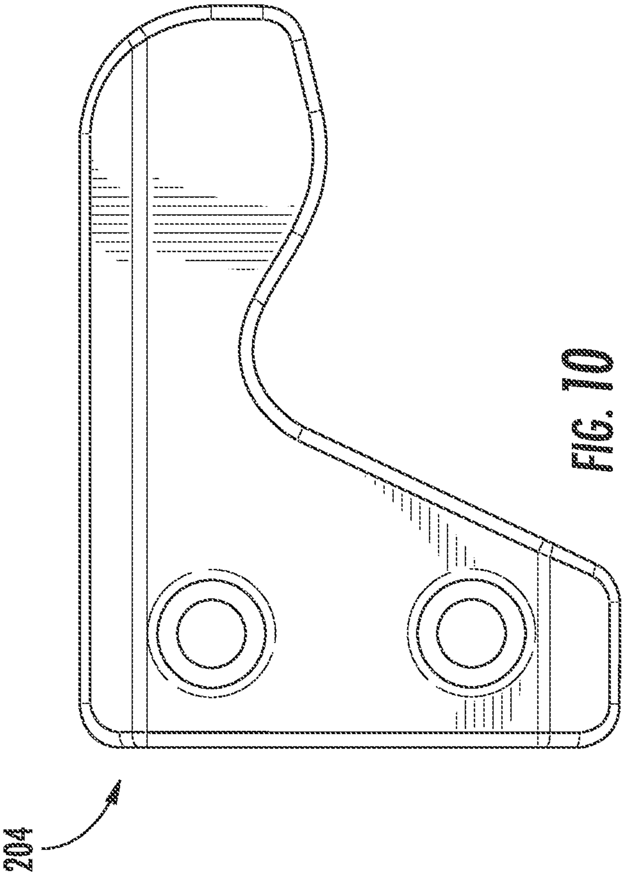
FIG. 10 illustrates a front view of the hold-down bracket shown in FIG. 5, with the rear view being a mirror image of that shown in FIG. 10.
Figure 7:
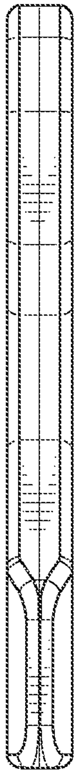
FIG. 7 illustrates a bottom view of the hold-down bracket shown in FIG. 5.
Figure 8:
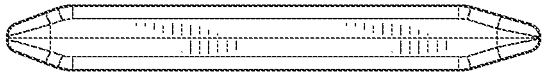
FIG. 8 illustrates a left side view of the hold-down bracket shown in FIG. 5.

Referring now to FIGS. 5-10 several views of one embodiment of a hold-down bracket 204 suitable for use within the system 200 described above with reference to FIG. 4 is illustrated in accordance with aspects of the present subject matter, particularly illustrating the bracket 204 configured to accommodate an inside-mounting arrangement for a covering. Specifically, FIG. 5 illustrates a perspective view of the hold-down bracket 204 and FIGS. 6, 7, 8, and 9 illustrate top, bottom, left side, and right side views, respectively, of the hold-down bracket 204 shown in FIG. 5. In addition, FIG. 10 illustrates a front view of the hold-down bracket 204 shown in FIG. 5, with the rear view being a mirror image of that shown in FIG. 10.

As shown in the illustrated embodiment, the hold-down bracket 204 is generally configured as a unitary body or component including a mounting portion 220 and a retention portion 222, with the mounting portion 220 being configured for mounting the bracket 204 relative to an adjacent structural structure (e.g., an adjacent frame or wall) and the retention portion 222 being configured for engaging the corresponding retention structure of the covering 20. As particularly shown in FIG. 5, the mounting portion 220 of the hold-down bracket 204 defines through-holes or fastener openings 224 (e.g., counter-bored openings) extending through the bracket 204 from an outwardly facing, front side 226 of the bracket 204 to an inwardly facing, rear side 228 of the bracket 204. In general, the fastener openings 224 are configured to receive suitable fasteners for mounting the bracket 204 relative to the adjacent architectural structure. For instance, the bracket 204 may be positioned relative to a frame or wall such that the rear side 228 of the bracket 204 faces towards and is flush against such structural feature. Suitable fasteners (e.g., screws) may then be inserted through the openings 224 and screwed into the adjacent structural feature to secure the bracket 204 thereto. It should be appreciated that, when the hold-down bracket 204 is configured to be installed along the side of a window frame adjacent to the window sill (e.g., frame 206 shown in FIG. 4) to allow the associated covering to be retained at its fully extended position, a bottom side 230 of the bracket 204 may, in one embodiment, be placed in contact with the window sill to properly locate the bracket 204 relative to the window frame.

Additionally, in several embodiments, the retention portion 222 of the hold-down bracket 204 is generally configured as a retention hook or arm 232 extending outwardly from the mounting portion 220 to a distal end 234 of the bracket 204. As shown in FIG. 5, the retention arm 232 defines a recessed retention groove 236 configured to receive the corresponding retention structure of the covering 20 (e.g., the retention pin 62, 64 projecting outwardly from the bottom rail 24—as indicated by the dashed lines in FIG. 5). In such an embodiment, to couple the bottom rail 24 to the hold-down bracket 204, the bottom rail 24 may pulled downwardly (indicated by arrow 237 in FIG. 5) and pushed rearwardly (indicted by arrow 238 in FIG. 5) relative to the bracket 204 such that the retention pin 63, 64 is moved downwardly past the distal end 234 of the bracket 204 and around the bottom side of the retention arm 232 before being directed rearwardly for receipt into the retention groove 236 (e.g., as indicated by arrows 240). At such position, the retention pin 62, 64 may be retained within the retention groove 236 via the tension in the lift cords provided by the overpowered lift system of the covering. To decouple the bottom rail 24 from the hold-down bracket 204, the bottom rail 24 may be pulled downwardly (indicated by arrow 237 in FIG. 5) and forwardly (indicted by arrow 244 in FIG. 5) relative to the bracket 204 such that the retention pin 62, 64 is moved out of the retention groove 236 and along the bottom side of the retention arm 232 before clearing the distal end 234 of the retention arm 232 (e.g., as indicated by arrows 246), at which point the bottom rail 24 may be released to allow the overpowered lift system to raise the covering towards the fully retracted position. As opposed to simply releasing the bottom rail 24, the user may, instead, assist in guiding the bottom rail 24 upwardly as the lift system functions to raise the covering towards the fully retracted position.

Figure 12:
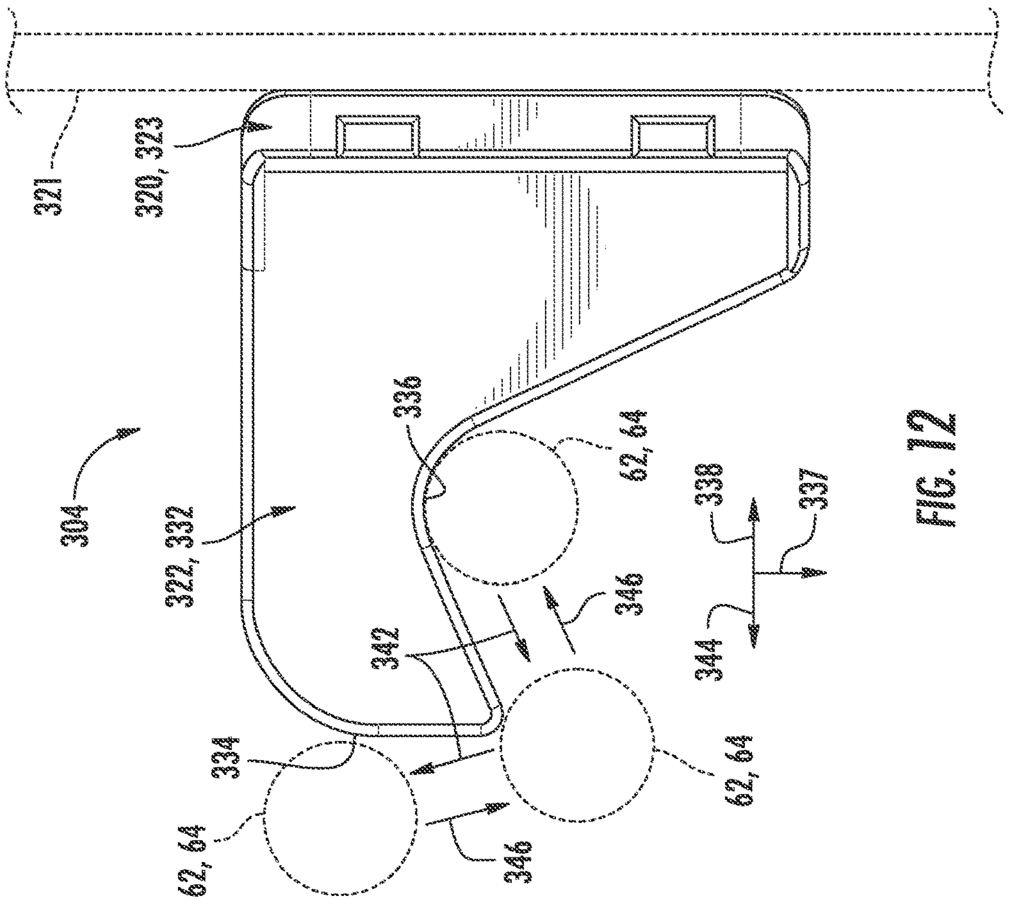
FIG. 12 illustrates a front view of the hold-down bracket shown in FIG. 11.
Figure 11:
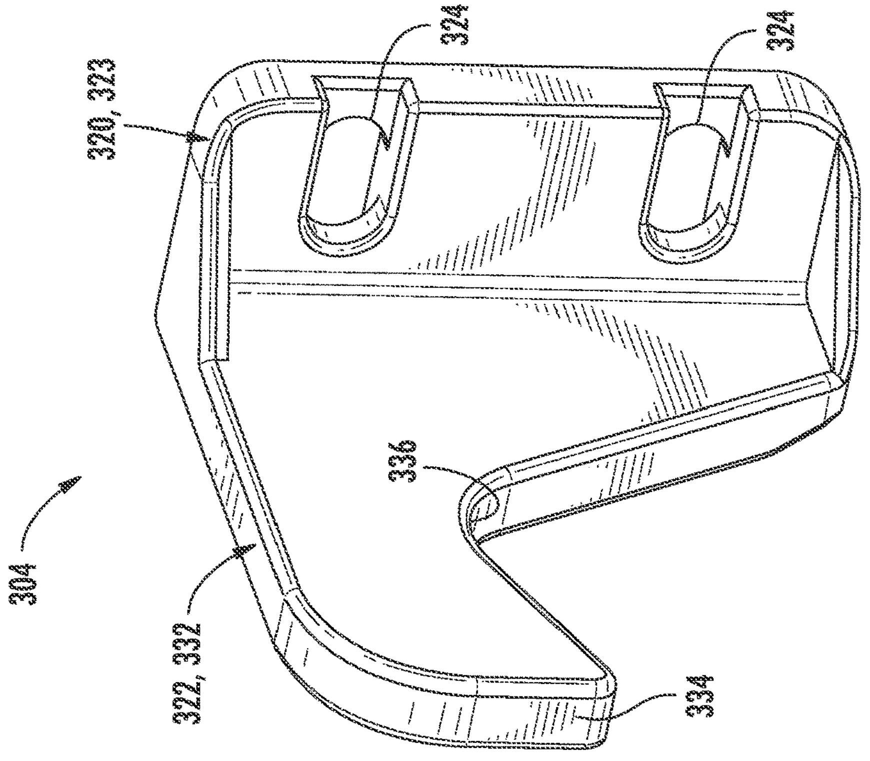
FIG. 11 illustrates a perspective view of another embodiment of a hold-down bracket suitable for use within the disclosed covering system in accordance with aspects of the present subject matter.
Figure 17:
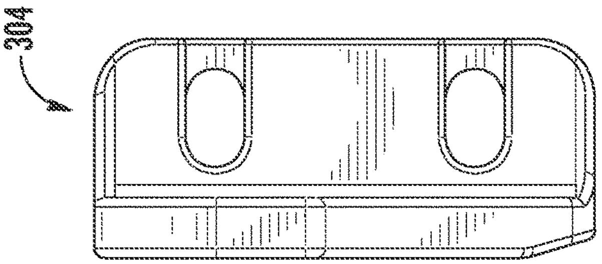
FIG. 17 illustrates a right side view of the hold-down bracket shown in FIG. 11.
Figure 14:
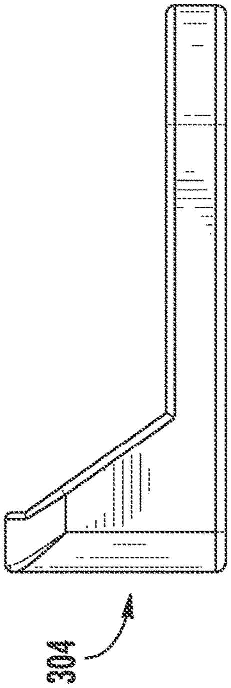
FIG. 14 illustrates a top view of the hold-down bracket shown in FIG. 11.
Figure 13:
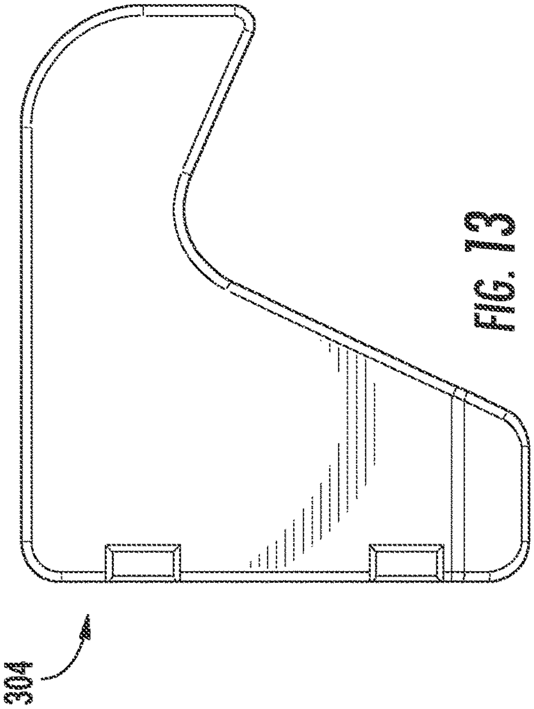
FIG. 13 illustrates a rear view of the hold-down bracket shown in FIG. 11.
Figure 15:
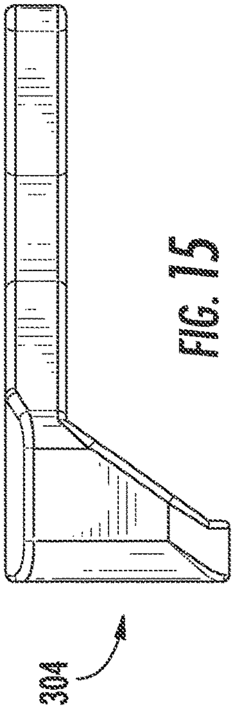
FIG. 15 illustrates a bottom view of the hold-down bracket shown in FIG. 11.
Figure 16:
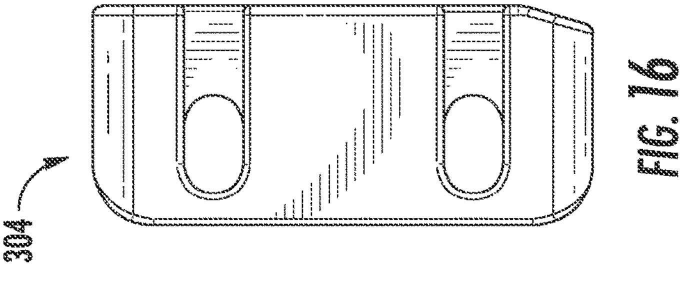
FIG. 16 illustrates a left side view of the hold-down bracket shown in FIG. 11.

Referring now to FIGS. 11-17, several views of another embodiment of a hold-down bracket 304 suitable for use within the system 200 described above with reference to FIG. 4 is illustrated in accordance with aspects of the present subject matter particularly illustrating the bracket 304 configured to accommodate an outside-mounting arrangement for a covering. Specifically, FIG. 11 illustrates a perspective view of the hold-down bracket 304 and FIGS. 12 and 13 illustrate front and rear views, respectively of the hold-down bracket 304 shown in FIG. 11. In addition, FIGS. 14, 15, 16, and 17 illustrate top, bottom, left side, and right side views, respectively, of the hold-down bracket 304 shown in FIG. 11.

As shown in the illustrated embodiment, the hold-down bracket 304 is generally configured as a unitary body or component including a mounting portion 320 and a retention portion 322, with the mounting portion 320 being configured for mounting the bracket relative to an adjacent architectural structure (e.g., to an adjacent frame or wall—as indicated by line 321 in FIG. 12) and the retention portion 322 being configured for engaging the corresponding retention structure of the covering. As particularly shown in FIGS. 11 and 12, similar to the mounting bracket 204 described above with reference to FIGS. 5-10, the mounting portion 320 of the hold-down bracket 304 defines through-holes or fastener openings 324 (e.g., counter-bored openings) configured to receive suitable fasteners for mounting the bracket 304 to the adjacent structural feature. However, unlike the embodiment described above, the mounting portion 320 is configured as a flange 323 that extends generally perpendicular to the retention portion 322 of the bracket 304. As a result, with the mounting portion 320 seated flush against the adjacent structural feature (e.g., wall 321), the retention portion 322 of the bracket 302 projects outwardly from the adjacent structural feature (e.g., at a right angle).

Additionally, as shown in FIGS. 11 and 12, the retention portion 322 of the hold-down bracket 304 is configured similarly to the retention portion 222 of the mounting bracket 204 described above with reference to FIGS. 5-10. For instance, the retention portion 322 is generally configured as a retention arm 332 extending outwardly from the mounting portion 320 to a distal end 334 of the bracket 304. As shown in FIGS. 11 and 12, the retention arm 332 defines a recessed retention groove 336 configured to receive the corresponding retention structure of the covering (e.g., the retention pin 62, 64 projecting outwardly from the bottom rail 24—as indicated by the dashed lines in FIG. 12). In such an embodiment, to couple the bottom rail 24 to the hold-down bracket 304, the bottom rail 24 may be pulled downwardly (indicated by arrow 337 in FIG. 12) and pushed rearwardly (indicted by arrow 338 in FIG. 12) relative to the bracket 304 such that the retention pin 62, 64 is moved downwardly past the distal end 334 of the bracket 304 and around the bottom side of the retention arm 332 before being directed rearwardly for receipt into the retention groove 336 (e.g., as indicated by arrows 342). At such position, the retention pin 62, 64 may be retained within the retention groove 336 via the tension in the lift cords provided by the overpowered lift system of the covering. To decouple the bottom rail 24 from the hold-down bracket 304, the bottom rail 24 may be pulled downwardly (indicated by arrow 337 in FIG. 12) and forwardly (indicted by arrow 344 in FIG. 12) relative to the bracket 304 such that the retention pin 62, 64 is moved out of the retention groove 336 and along the bottom side of the retention arm 332 before clearing the distal end 334 of the retention arm 332 (e.g., as indicated by arrows 346), at which point the bottom rail 24 may be released to allow the overpowered lift system to raise the covering towards the fully retracted position. As opposed to simply releasing the bottom rail 24, the user may, instead, assist in guiding the bottom rail 24 upwardly as the lift system functions to raise the covering towards the fully retracted position.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A covering system for an architectural structure, comprising:

a covering movable between an extended position and a retracted position, the covering including a headrail, a bottom rail supported relative to the headrail, and at least one stackable covering element positioned between the headrail and the bottom rail, the covering further comprising an overpowered lift system configured to provide a lifting force that raises the bottom rail relative to the headrail towards the retracted position of the covering, the overpowered lift system comprising:

at least one lift cord extending between the headrail and the bottom rail;

a lift rod coupled to the at least one lift cord; and a variable torque motor assembly operably coupled to the lift rod and being configured to at least partially provide the lifting force for raising the bottom rail relative to the headrail; and at least one hold-down bracket configured to be mounted relative to the architectural structure;

wherein:

retention structure is provided in operative association with the bottom rail;

the retention structure is configured to engage the at least one hold-down bracket to hold the bottom rail in position relative to the headrail against the lifting force provided by the overpowered lift system;

the variable torque motor assembly comprises a spring motor and a separate transmission operably coupled between the spring motor and lift rod;

the spring motor is configured to provide a substantially constant torque output; and the transmission is configured to convert the substantially constant torque output provided by the spring motor to a variable torque output that is applied to the lift rod as the covering is moved between the extended and retracted positions.

2. The covering system of claim 1, wherein:

the at least one hold-down bracket comprises first and second hold-down brackets;

the retention structure comprises first and second retention features positioned at opposed first and second sides, respectively, of the bottom rail; and the first retention feature is configured to engage the first hold-down bracket along the first side of the bottom rail and the second retention feature is configured to engage the second hold-down bracket along the second side of the bottom rail.

3. The covering system of claim 2, wherein:

the first retention feature comprises a first retention pin extending outwardly from the first side of the bottom rail; and the second retention feature comprises a second retention pin extending outwardly from the second side of the bottom rail.

4. The covering system of claim 1, wherein the at least one hold-down bracket comprises a retention arm configured to engage the retention structure to hold the bottom rail in position relative to the headrail.

5. The covering system of claim 4, wherein:

the retention arm defines a retention groove; and the retention structure comprises a retention pin extending outwardly from the bottom rail, with the retention pin configured to be received within the retention groove defined by the retention arm.

6. The covering system of claim 1, wherein the overpowered lift system further comprise a booster spring motor separate from the variable torque motor assembly, the booster spring motor being coupled to the lift rod and being configured to provide an additional torque output to the lift rod independent of the variable torque output provided by the transmission.

7. The covering system of claim 6, wherein the additional torque output provided by the booster spring motor is a substantially constant torque output.

8. The covering system of claim 1, wherein the overpowered lift system further comprises:

a booster spring motor configured to apply an additional torque output to the lift rod independent of the variable torque output provided by the transmission.

9. The covering system of claim 8, wherein:

the variable torque output applied by the transmission is balanced relative to a base torque curve for the covering; and the additional torque output applied by the booster spring motor provides a torque curve for the overpowered lift system that exceeds the base torque curve at each position along a drop length of the covering defined between the extended and retracted positions.

10. The covering system of claim 8, wherein the additional torque output provided by the booster spring motor is a substantially constant torque output.

11. The covering system of claim 1, wherein the at least one stackable element comprises a plurality of slats supported between the headrail and the bottom rail.

12. The covering system of claim 1, wherein:

the extended position comprises a fully extended position of the covering and the retracted position comprises a fully retracted position of the covering; and the overpowered lift system is configured to provide a lifting force that is sufficient to fully raise the bottom rail relative to the headrail from the fully extended position to the fully retracted position.

13. The covering system of claim 1, wherein:

the retracted position comprises a fully retracted position of the covering and the extended position comprises a non-retracted position of the covering at which the bottom rail is lowered relative to the headrail to a position at which the retention structure is engageable with the at least one hold-down bracket; and when the retention structure is disengaged from the at least one hold-down bracket such that the bottom rail is unconstrained relative to the architectural structure, the overpowered lift system provides a lifting force that fully raises the bottom rail relative to the headrail from the non-retracted position to the fully retracted position.

14. A covering for an architectural structure, the covering being movable between a retracted position and an extended position, the covering comprising:

a headrail;

rail;

a bottom rail supported relative to the headrail;

at least one stackable covering element positioned between the headrail and the bottom an overpowered lift system configured to provide a lifting force that raises the bottom rail relative to the headrail towards the retracted position of the covering, the overpowered lift system comprising:

at least one lift cord extending between the headrail and the bottom rail;

a lift rod coupled to the at least one lift cord;

a variable torque motor assembly operably coupled to the lift rod, the variable torque motor assembly configured to apply a variable torque output to the lift rod as the covering is moved between the extended and retracted positions; and a booster spring motor separate from the variable torque motor assembly, the booster spring motor configured to apply an additional torque output to the lift rod independent of the variable torque motor assembly; and retention structure provided in operative association with the bottom rail, the retention structure being configured to engage at least one hold-down bracket to hold the bottom rail in position relative to the headrail against the lifting force provided by the overpowered lift system;

wherein:

the variable torque output applied by the variable torque motor assembly is balanced relative to a base torque curve for the covering representing a torque demand for the covering as a function of a drop length of the covering; and the additional torque output applied by the booster spring motor provides a torque curve for the overpowered lift system that exceeds the base torque curve at each position along the drop length of the covering defined between the extended and retracted positions.

15. The covering of claim 14, wherein:

the variable torque motor assembly comprises a spring motor and a transmission operably coupled to the spring motor; and the transmission is configured to apply the variable torque output to the lift rod as the covering is moved between the extended and retracted positions.

16. The covering of claim 14, wherein the additional torque output provided by the booster spring motor is a substantially constant torque output.

17. The covering of claim 14, wherein the additional torque output provided by the booster spring motor is a substantially constant torque output.

18. The covering of claim 14, wherein the at least one stackable element comprises a plurality of slats supported between the headrail and the bottom rail.

19. The covering of claim 14, wherein:

the extended position comprises a fully extended position of the covering and the retracted position comprises a fully retracted position of the covering; and when the retention structure is disengaged from the at least one hold-down bracket such that the bottom rail is unconstrained relative to the architectural structure, the overpowered lift system provides a lifting force that fully raises the bottom rail relative to the headrail from the fully extended position to the fully retracted position.

20. The covering system of claim 14, wherein:

the retracted position comprises a fully retracted position of the covering and the extended position comprises a non-retracted position of the covering at which the bottom rail is lowered relative to the headrail to a position at which the retention structure is engageable with the at least one hold-down bracket; and when the retention structure is disengaged from the at least one hold-down bracket such that the bottom rail is unconstrained relative to the architectural structure, the overpowered lift system provides a lifting force that fully raises the bottom rail relative to the headrail from the non-retracted position to the fully retracted position.

* * * * *